United States Patent [19]

Alexander

[11] 4,204,903
[45] May 27, 1980

[54] APPARATUS AND METHOD FOR HANDLING UNCURED TIRES

[75] Inventor: Joseph H. Alexander, Kent, Ohio

[73] Assignee: The General Tire & Rubber Company, Akron, Ohio

[21] Appl. No.: 945,045

[22] Filed: Sep. 22, 1978

[51] Int. Cl.² .................. B29H 17/20; B29H 17/37
[52] U.S. Cl. ................... 156/394; 156/126; 212/12; 224/42.12; 414/222
[58] Field of Search ............ 156/111, 126, 127, 128, 156/129, 394, 396, 405 R, 414, 416, 417; 212/11, 12; 214/151; 224/42.12–42.19

[56] References Cited

U.S. PATENT DOCUMENTS

| | | | |
|---|---|---|---|
| 3,374,138 | 3/1968 | Porter et al. | 156/400 |
| 3,442,746 | 5/1969 | Robertson | 156/396 |
| 3,475,254 | 10/1969 | Henley | 156/401 |
| 3,532,577 | 10/1970 | Niclas et al. | 156/394 |
| 3,909,335 | 9/1975 | Jellison | 156/126 |
| 3,945,866 | 3/1976 | Rudder et al. | 156/126 |
| 4,039,365 | 8/1977 | Takasuga | 156/126 |
| 4,039,366 | 8/1977 | Yabe | 156/126 |
| 4,093,495 | 6/1978 | Colombani | 156/126 |

Primary Examiner—John E. Kittle

[57] ABSTRACT

An improved tire building and tire transfer apparatus and method includes a pivotally mounted transfer ring. After picking up an uncured tire band from its building drum and transferring the tire band to a position away from the building drum, the transfer ring is capable of pivoting about a vertical axis to rotate the tire band. In the rotated position, the tire band can be transferred to a tire support arm and carried away from the transfer ring.

5 Claims, 6 Drawing Figures

APPARATUS AND METHOD FOR HANDLING UNCURED TIRES

FIELD OF THE INVENTION

This invention relates to the building and handling of uncured tire bands, and more particularly to an improved tire band transfer ring and an improved tire band handling method involving the use of this transfer ring.

BACKGROUND OF THE INVENTION

One method of building radial tires involves the building of a tread band with breaker plies on an assembly drum, and then transferring this tread band by means of a transfer ring to a carcass mounted on an inflatable building drum. An example of such a tire building method and apparatus is shown in U.S. Pat. No. 3,475,254 to V. E. Henley, assigned to the assignee of the present invention. Another example of the transfer ring is shown in U.S. Pat. No. 3,442,746 to M. N. Robertson, also assigned to the assignee of the present invention.

After the tire is built using apparatus such as that shown in the foregoing patents, the common practice has been simply to deflate the building drum and remove the uncured tire band by hand. The operator then usually places the tire band in a cart or another suitable transport or storage apparatus. With the building of larger radial tires, however, such handling of uncured tire bands by hand can be extremely difficult if not impossible, because of their great weight. Also, the handling of heavy, uncured tire bands is an inefficient procedure, because a skilled tire builder's time and energy can be put to better use than in lifting and carrying such tire bands.

A mechanism for removing an uncured tire band from a building drum is shown in U.S. Pat. No. 3,374,138 to Porter et al. The tire building machine of this patent includes a ring whose only function is to remove the tire band from the building drum. This removal ring is mounted on a pair of overhead I-beams extending in the same direction as the axis of the ring and the building drum. Mounted on these I-beams are rollers that roll on a second pair of I-beams that are perpendicular to the first pair, thus allowing the removal ring to be moved in a horizontal direction perpendicular to the building drum axis. The second pair of I-beams in turn have rollers that roll on a main beam that extends in the same direction as the first pair of I-beams and the axis of the building drum. This allows the removal ring to be moved parallel to the building drum axis. With this rather complex mounting system, the removal ring can be moved axially to a position over an uncured tire, pick up the tire, be moved axially away from the building drum, and then in a direction perpendicular to the drum axis and to a position out of the way of the building drum.

One problem with the tire removal ring of the foregoing Porter patent is that when the ring is moved perpendicular to the drum axis, it moves out from under the main beam that supports the ring and its whole mounting system. This creates a severe moment that can easily cause tilting of the ring and the uncured tire carried thereon. Also, the rollers and other parts of the mounting system are likely to wear badly or break due to the forces created by this moment. This problem could be alleviated by providing a second main beam disposed over the place where the removal ring is to be moved when it is moved out of the way of the building drum. The second pair of I-beams of the ring mounting system would then extend between two main support beams. However, there would still be undesirable forces created while the removal ring with the heavy tire band is moving along this second pair of I-beams between the two main support beams. In view of this, it might be necessary to provide at intermediate positions a third and perhaps a fourth main beam to support the second pair of beams, particularly if the span of this second pair of I-beams is to be a substantial distance. These modifications would not only be expensive but the space requirements for additional supporting beams would complicate the design of an overhead mounted carrying system for taking the tire band from the removal ring and carrying the band to another location in the factory. This is because such a carrying system would have to have a pick-up device that moves into a position parallel to and directly under the additional supporting beams so that it can be aligned with the axis of the tire band that remains at all times aligned with these supporting beams.

Other problems with the ring mounting system shown in the Porter patent is that the removal ring cannot be positioned very accurately over an uncured tire on the building drum, and the ring cannot be held steady while it is picking up an uncured tire from the building drum, or while the tire band is being removed at a place distant from the building drum. These problems arise from the lateral play allowed by the wheel and I-beam type mounting of Porter's tire removal ring and from the fact that there are no positive stopping or holding means for maintaining the wheels stationary on the I-beams while the removal ring is picking up or unloading a tire band.

The lateral play problem could be solved by mounting the removal ring on bearings sliding on cylindrical rails, such as shown in U.S. Pat. Nos. 3,475,254 (Henley) and 3,442,746 (Robertson), mentioned above. However, the mounting system of the Porter patent would require two sets of such sliding bearing and rail arrangements. This would increase the cost and complexity of what is already a fairly complex ring mounting system.

Another system that provides lateral mobility for a transfer ring for tire bands is shown in U.S. Pat. No. 3,532,577 to W. Niclas et al. This patent shows a transfer ring mounted on a single pair of bearings on a single pair of cylindrical rails. The ends of the rails adjacent the building drum are mounted on a carriage that pivots on a vertical shaft, while the other ends of the rails are mounted on a carriage that rides on an arcuate shaft. The object of this apparatus is to provide a transfer ring that can pick up tread belts from any of a plurality of belt building drums. However, this would have several disadvantages if it were to be used as a tire band removal device. First, as with the system of the Porter patent, the rails space requirements for supporting the transfer ring would unduly complicate the design of an overhead mounted carrying system for taking the tire band from the transport ring and carrying the band to another location in the factory. Secondly, the arcuate beam and roller mounted carriage riding on this beam between the tread strip building stations is unnecessarily complicated and expensive. The arcuate beam, in particular, complicates matters, because it would have to be very strong to support the larger sizes of tires as the carriage on this rail moves from one end of the rail to the other. Also, because the beam bows out laterally between its supports, it would be prone to twisting under heavy loads.

SUMMARY OF THE INVENTION

The present invention provides an improved apparatus and method of handling uncured tires that enables the ring used for transferring tread bands to the building drum to be used also for removing the completed uncured tire band from the tire building drum and transferring it to a suitable carrying device that removes the tire band to another location in the factory. The invention eliminates the need for the operator picking up or carrying the tire by hand. Also, the invention overcomes the disadvantages of previous apparatus that employs laterally movable transfer of tire removal rings. This is because the transfer ring performs its new functions without the need for additional cross rails perpendicular to the rails that carry it between the tread strip building drum and the tire building drum. This means less complicated, less costly apparatus that fits well with an overhead mounted carrying system for taking a tire band from the transfer ring to another location in the factory.

These objects and advantages of the present invention are accomplished by providing an apparatus with rail means extending parallel to the axis of the tire building drum, a carriage mounted on this rail means, and a transfer ring connected to this carriage by a journal bearing means. There is a first lug surface on the transfer ring and a second lug surface on the carriage, with these lugs surfaces positioned to engage each other to stop the rotation of said transfer ring in a first direction when the ring is axially aligned with the tire building drum. There is also a third lug surface on the transfer ring and a fourth lug surface on the carriage, with these third and fourth surfaces positioned to engage each other to stop the rotation of the transfer ring in the direction opposite from the first mentioned direction when the axis of the transfer ring is disposed at a desired angle to the axis of the building drum for transferring an uncured tire band held by the transfer ring to a suitable transport means. In addition, the present invention includes a first releasable means for holding the first lug surface in engagement with the second lug surface to hold the transfer ring in axial alignment with the tire building drum, and a second releasable means for holding the third lug surface in engagement with the fourth lug surface to hold the transfer ring with its axis disposed at the above mentioned desired angle to the axis of the building drum. Preferably these releasable means are in the form of electromagnets and magnetically attractable means with surfaces forming the above mentioned lug surfaces, and electric circuit means for energizing and de-energizing these electromagnets.

These and other details, objects, and advantages of the present invention will be more apparent from the following detailed description of one embodiment of the invention and the attached drawings.

DESCRIPTION OF A PREFERRED EMBODIMENT

Figure 1:
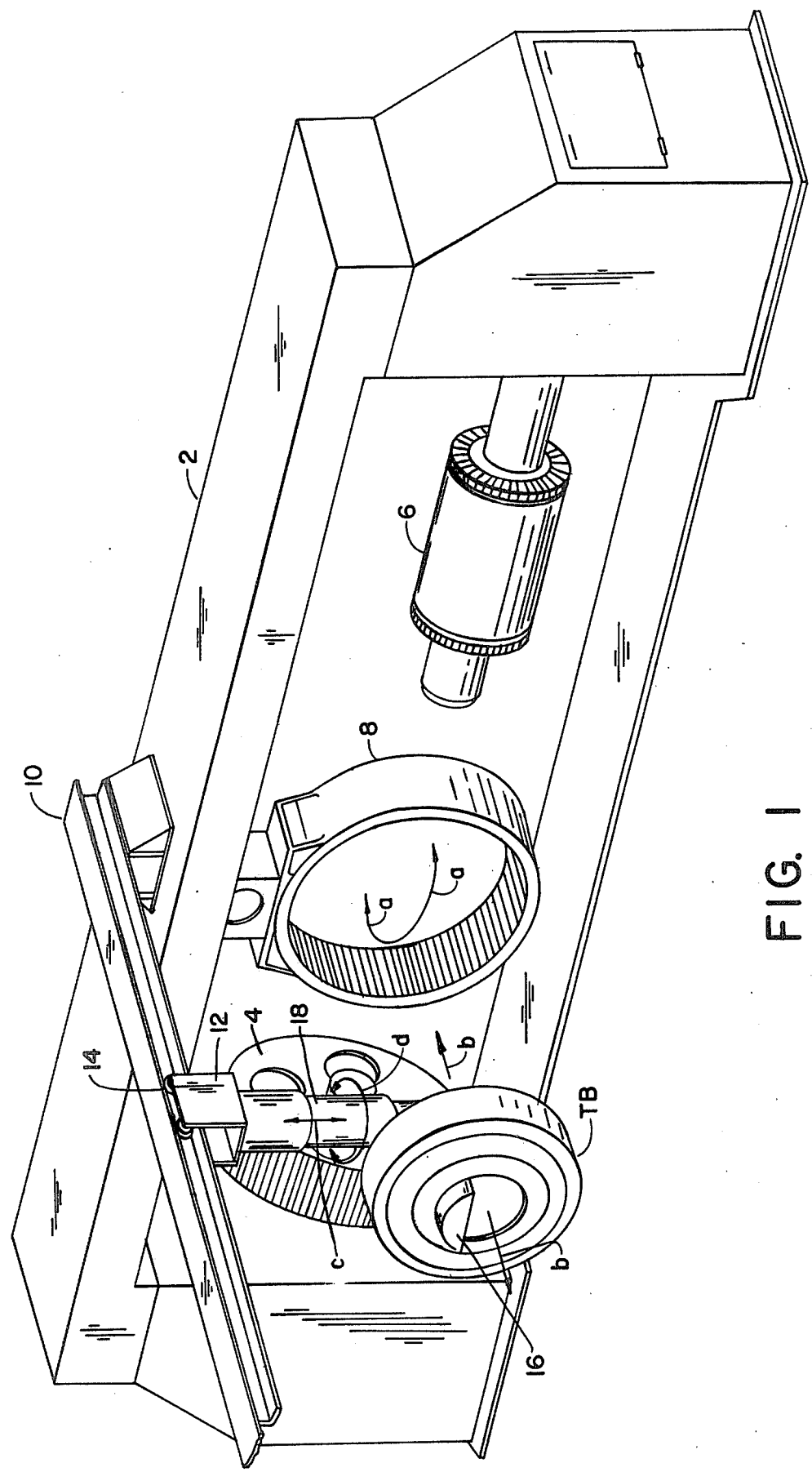
FIG. 1 is a perspective view of a tire building apparatus and apparatus for carrying away uncured tire bands from the tire building apparatus, illustrating one embodiment of the present invention.
Figure 3:
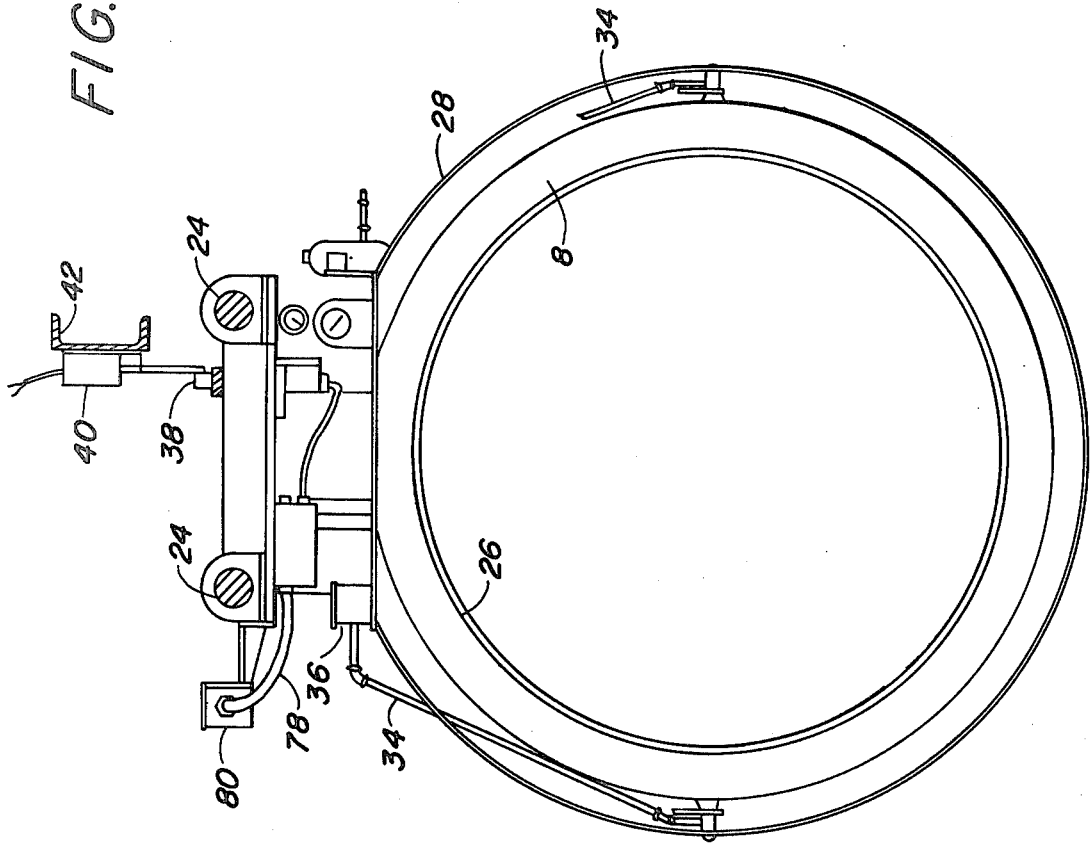
FIG. 3 is a front elevation of the transfer ring, carriage, and rail means shown in FIG. 2.

FIG. 1 shows a tire building apparatus 2 having at one end a tread band building drum 4 and at its other end a tire building drum 6. Positioned between the drums 4 and 6 is a transfer ring 8 that is designed for carrying tread bands built on the drum 4 over to the tire building drum 6.

The transfer ring 8 is rotatable in either direction about a vertical axis, as indicated by the arrows a. When transporting tread bands to the tire building drum 6, the transfer ring 8 is rotated to and maintained in a position in which it is axially aligned with the drums 4 and 6, which is perpendicular to its position shown in FIG. 1.

When the transfer ring positions the tread band over the tire building drum 6, the drum 6 is inflated to join the tire carcass to the tread band, as shown for instance in U.S. Pat. No. 3,475,254 to V. E. Henley. Then the transfer ring 8 releases the tread band, as for instance by the manner and means shown in the Henley patent, and the transfer ring 8 is backed away from the tire building drum 6 while the forming of the uncured tire band on the drum 6 is completed.

According to the method of the present invention, the transfer ring 8 is then re-positioned over the completed uncured tire band on the drum 6. The transfer ring grasps hold of the tire band, using such means as annular inflatable bladders as shown in the aforementioned Henley patent, and the tire building drum 6 is deflated to complete the transfer of the uncured tire band to the transfer ring 8.

After picking up the uncured tire band, the transfer ring 8 is moved to the position shown in FIG. 1. In this position the transfer ring is rotated from a position axially aligned with the drums 4 and 6 to a position in which its axis is aligned with an overhead rail 10, as shown in FIG. 1. In this position, the uncured tire may be picked up from the transfer ring 8 and carried to another location in the factory by a suitable transport apparatus.

An example of such a suitable transport apparatus is shown in FIG. 1. A carriage 12 rides on rollers 14 on the rail 10, and a tire band pick-up arm 16 is supported beneath the carriage 12 by a rotatable, telescoping shaft 18. Because of the mounting of carriage 12 on the rail 10, the pick-up arm 16 may be moved toward or away from the tire building apparatus 2 in the direction of arrows b. The rotatable, telescoping shaft 18, enables the arm 16 to be raised or lowered in the direction of arrows c, or turned about a vertical axis in either direction as indicated by the arrows d. With these capabilities, the arm 16 may move into the central opening of an uncured tire band held by the transfer ring 8, take the tire band from the transfer ring, turn around, and carry off the tire band to another part of the factory, as the arm 16 is shown doing with the tire band TB in FIG. 1. The tire band TB is thus removed from the tire building drum 6 and carried away from the tire building apparatus 2 without having to be lifted or carried by hand.

The key to this operation is in the rotatable transfer ring 8, which can not only be accurately aligned and positioned over the tire building drum 6 for the purpose of aligning and applying the tread band to the tire carcass, but can also be rotated and fixed in a second position in which it can hold a completed tire band for easy transfer to a carrying device that moves toward and away from the apparatus 2, such as for example the pick-up arm 16.

The details of the transfer ring 8 are shown in FIGS. 2 through 6. As shown best in FIGS. 2 and 3, the transfer ring 8 is suspended from a carriage 20 that has sleeves 22 that slide on cylindrical rails 24. The rails 22 extend lengthwise of the apparatus 2 in FIG. 1, and are parallel to the axes of the tread and tire building drums 4 and 6. The carriage 20 may be driven along the rails 24 by an endless chain and drive motor, not shown. Examples of such drive systems are found in U.S. Pat. Nos. 3,442,746 and 3,475,254, referred to in the background description above. On its axially inward facing surface 26, the transfer ring 8 is equipped with a suitable means, not shown, for picking up tire bands, such as the inflatable bladders shown in U.S. Pat. No. 3,475,254 to Henley or the spring loaded arcuate plates shown in U.S. Pat. No. 3,374,138 to Porter et al. The rings 28 surrounding the transfer ring 8 on either side are safety devices and are connected by rods 30 to switches 32 on the sides of the transfer ring 8. Electric cables 34 connect the switches 32 to junction box 36. By means of this connection the switches 36 stop the motor drive that moves the carriage 20 along rails 24, whenever the rings 28 are struck by an object in the way of transfer ring 8. The carriage 20 is also stopped at desired places along the length of rails 24 by a lug 38 contacting limit switches such as switch 40, positioned along the length of overhead beam 42.

Figure 4:
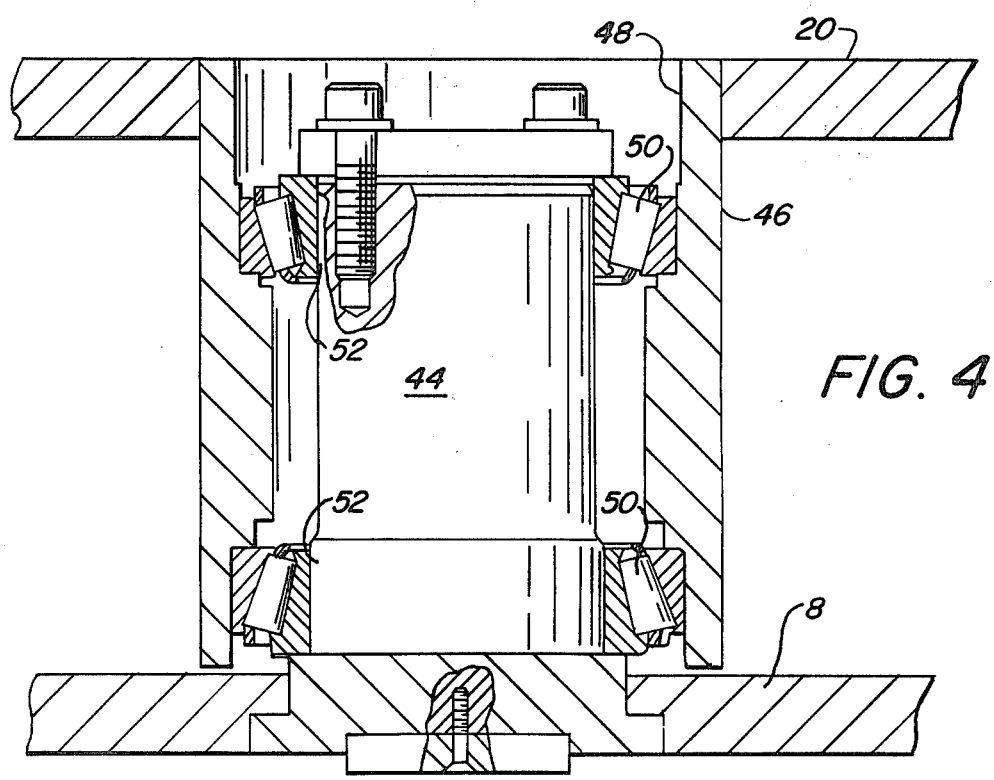
FIG. 4 is an enlarged sectional view of a portion of the transfer ring and carriage of FIGS. 1 and 2, taken along lines 4—4 of FIGS. 3 and 5.
Figure 5:
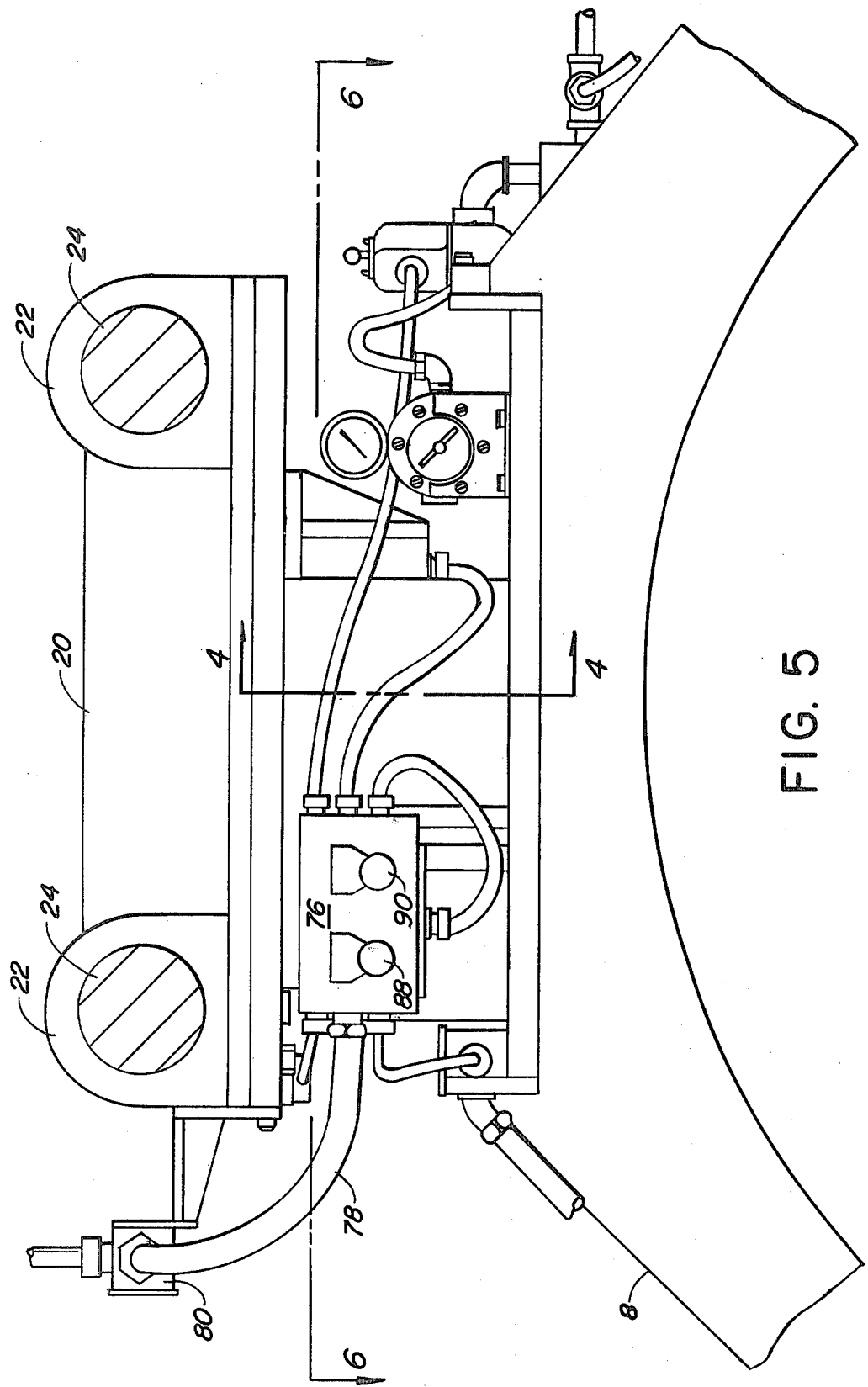
FIG. 5 is an enlarged front elevation of a portion of apparatus shown in FIG. 3.

The transfer ring 8 is connected to the carriage 20 by a journal and bearing means shown in FIG. 4. This journal and bearing means includes vertical shaft 44 connected to the upper part of transfer ring 8, and a bearing support 46 connected to the carriage 20. The bearing support 46 has a circular opening 48 that receives the shaft 44, and a pair of tapered roller bearings 50 pivotally connect the bearing support 46 to journal areas 52 on shaft 44.

Figure 6:
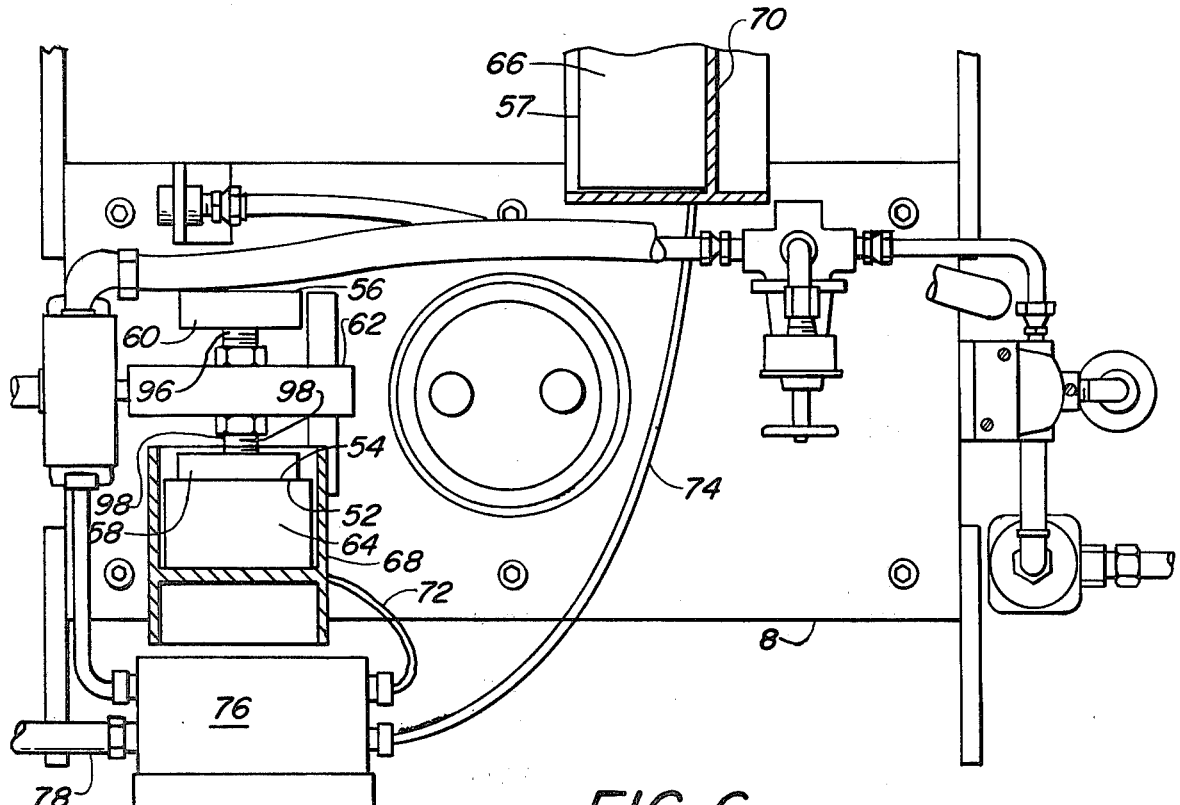
FIG. 6 is a sectional view of the apparatus of FIG. 5, taken along lines 6—6 of FIG. 5.

The transfer ring 8 thus rotates about a vertical axis on tapered roller bearings 50. As best seen in FIG. 6, this rotation is limited in the counter-clockwise directions by the engagement of first and second lug surfaces 52 and 54, and in the clockwise direction by the engagement of third and fourth lug surfaces 56 and 57. The first lug surface 52 and the third lug surface 56 are faces of adjustable stops 58 and 60 that are mounted on opposite sides of a vertical plate 62 on the top of transfer ring 8. The adjustable stops 58 and 60 are made of steel or another material that is magnetically attractable. The second and fourth lug surfaces 54 and 57, are faces of electromagnets 64 and 66 that are supported respectively by brackets 68 and 70 from the underside of the carriage 20.

Figure 2:
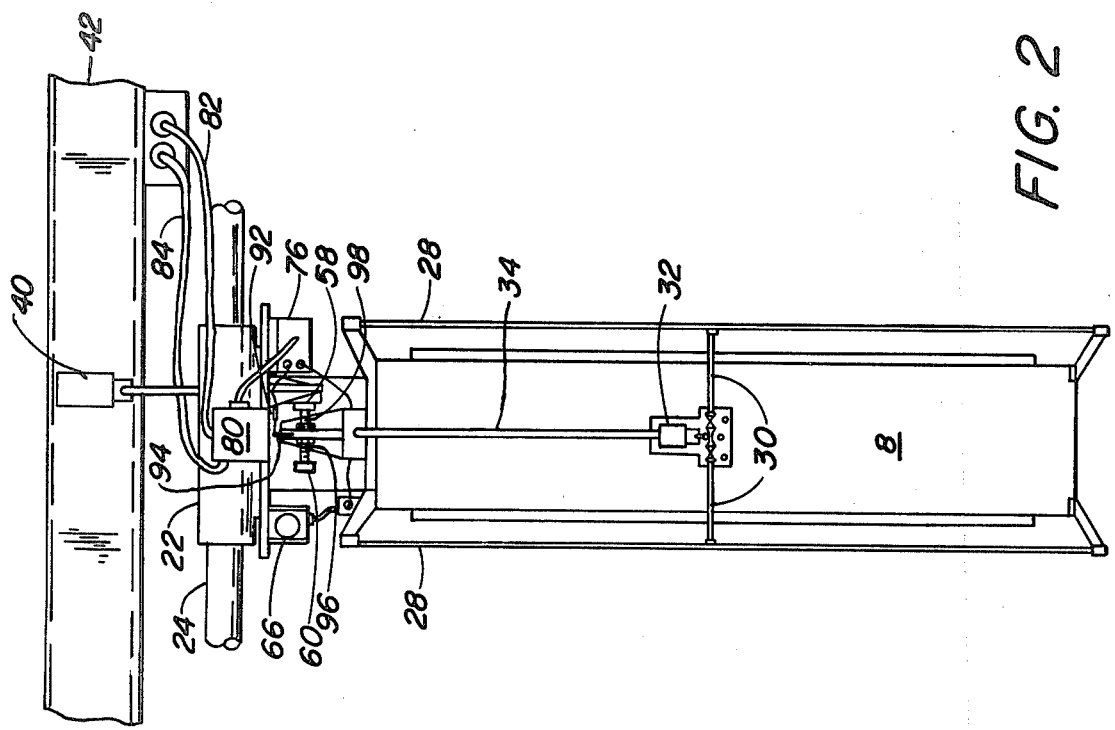
FIG. 2 is a side elevation of the transfer ring shown in FIG. 1 and a carriage and rail means for carrying this transfer ring.

The electromagnets 64 and 66 are connected by electric cables 72 and 74 to a junction box 76 which receives power from a main electrical supply cable 78. As seen in FIG. 2, the supply cable 78 is connected to another junction box 80, which receives power through electric cables 82 and 84 connected to a junction box 86 mounted on the main framework of apparatus 2.

Switches 88 and 90 on the junction box 76 (FIG. 5) control the energization and de-energization of the electromagnets 64 and 66. When the transfer ring 8 is in its position shown in FIGS. 2 through 6, with its axis aligned with overhead rails 24 (FIG. 2) and the axis of the building drums 4 and 6 (FIG. 1), the first lug surface 52 of the magnetically attractable stop 58 and second lug surface 54 of the electromagnet 64 engage each other. The electromagnet 64 is energized to hold the attractable lug surfaces 52 and 54 in this engagement, and thus prevent the rotation of the transfer ring 8. At the same time, a limit switch 92 mounted on the carriage 20 (FIG. 2) is closed by contact with a pin 94 on the transfer ring 8. The limit switch 92 must be closed in order for the motor driving the carriage 20 along rails 24 to operate. Thus, the transfer ring 8 may be moved along the rails 24 only when it is axially aligned with the building drums 4 and 6. This is a safety feature that also prevents damage that might occur if the transfer ring 8 were to be moved toward either the drum 4 or the drum 6 when it was not firmly locked in a position aligned with these drums.

When the transfer ring 8 is moved under the overhead rail 10 for the purpose of transferring an uncured tire band to the arm 16 (FIG. 1), it must be unlocked from its position in axial alignment with the drums 4 and 6, rotated to a position that is convenient and desirable for making the transfer to arm 16, and locked in this position. To accomplish this, the electromagnet 64 is de-energized, and the transfer ring 8 is rotated by hand until the third lug surface 56 on the magnetically attractable stop 60 engages the fourth lug surface 57 of electromagnet 66 (FIG. 6). The electromagnet 66 is then energized to hold the transfer ring 8 in its new position.

The stops 58 and 60 are on threaded shafts 96 and 98 (FIG. 2) so that they can be turned to make fine adjustments in the positions in which the transfer ring 8 is held by the electromagnets 64 and 66. It is very important that the transfer ring 8 be capable of being held fixed in the exact position axially aligned with the tire building drum 6. This is because the transfer ring 8 must be capable of accurately positioning a tread band on a tire carcass on the drum 6, in addition to performing its new functions of removing the completed tire band from the drum 6 and transferring the band to the pick-up arm 16.

In the present embodiment, the third and fourth lug surfaces 56 and 57 are positioned to engage each other when the transfer ring 8 is perpendicular to its position of axial alignment with the drums 4 and 6. This position for transferring the uncured tire band to the pick-up arm 16 is preferred, because it allows the arm 16 to be moved into the tire band at an approach angle that is perpendicular to the rails 24 and drums 4 and 6 of apparatus 2. There is thus a minimum of interference between the apparatus 2 and the rail 10, carriage 12 and other parts of the apparatus that carries the uncured tire band away from the apparatus 2. However, because of conditions in a particular factory location, it may be desirable to transfer the tire band from the transfer ring 8 to another carrying means when the transfer ring 8 is at an angle other than perpendicular to the axes of drums 4 and 6. In this case, the position of electromagnet 66 shown in FIG. 6 would have to be changed so that its lug surface 57 engages the lug surface 56 of stop 60 when the transfer ring 8 is at whatever angular position desired for transferring the uncured tire band.

The present invention thus provides a tire handling and building apparatus that includes a transfer ring that is not only capable of transferring a tread band to a tire carcass on an expandable building drum, but can also, by virtue of a few modifications and additions to its structure, remove the completed tire band from the building drum and transfer it safely and securely to another transport device without the need for manual lifting by the operator.

While one embodiment of the present invention has been shown and described, other embodiments or modifications or additions to the one shown will be apparent to those skilled in the art, while remaining within the scope of the appended claims.

I claim:

1. In an apparatus for removing an uncured tire band from a tire building drum having horizontal axis of rotation, said apparatus including rail means extending parallel to said axis of said drum, a carriage mounted on said rail means and movable along said rail means in a direction parallel to said tire building drum axis, and a transfer ring mounted on said carriage for holding said uncured tire band, the improvement comprising:
   (a) journal and bearing means having a vertical axis connecting said transfer ring to said carriage, said transfer ring being rotatable relative to said carriage about said vertical axis of said journal and bearing means;
   (b) a first lug surface on said transfer ring and a second lug surface on said carriage, said first and second lug surfaces positioned to engage each other to stop the rotation of said transfer ring in a first direction when said transfer ring is axially aligned with said tire building drum;
   (c) a third lug surface on said transfer ring and a fourth lug surface on said carriage, said third and fourth lug surfaces positioned to engage each other to stop the rotation of said transfer ring in the direction opposite from said first direction when the axis of said transfer ring is disposed at the desired angle to the axis of said building drum for transferring an uncured tire band held by said transfer ring to a suitable transport means;
   (d) first releasable means for holding said first lug surface in engagement with said second lug surface to hold said transfer ring in axial alignment with said tire building drum; and
   (e) second releasable means for holding said third lug surface in engagement with said fourth lug surface to hold said transfer ring with its axis disposed at said desired angle to said axis of said building drum.

2. The apparatus according to claim 1 wherein each of said first and second releasable means includes an electromagnet having a surface that is one of the lug surfaces associated with said releasable means and positioned to engage and be magnetically held by said electromagnet when said electromagnet is energized, and electric circuit means for energizing and de-energizing said electromagnet.

3. The apparatus according to claim 1 wherein said first and third lug surfaces are the opposite sides of a single block mounted on said transfer ring.

4. The apparatus according to claim 1 wherein said third and fourth lug surfaces are positioned to engage each other to stop the rotation of said transfer ring when the axis of said transfer ring is disposed substantially perpendicular to the axis of said building drum.

5. The apparatus according to claim 1 wherein said journal and bearing means includes a vertical shaft connected to said transfer ring, a bearing support connected to said carriage and having a circular opening for receiving siad shaft, and pair of tapered roller bearings connecting said shaft to said bearing support.

* * * * *